United States Patent Office 3,498,986

Patented Mar. 3, 1970

1

2

3,498,986

10-(ARYLAMINOALKYL)-9,9-DIMETHYLACRIDANS

Alex Meisels, Basel, and Angelo Storni, Basel-Land, Switzerland, assignors to Geigy Chemical Corporation, Greenburgh, N.Y., a corporation of Delaware No Drawing. Original application Mar. 21, 1966, Ser. No. 535,684, now Patent No. 3,452,021. Divided and this application July 17, 1968, Ser. No. 761,370

Int. Cl. C07d *37/06*, A61k *27/00*

U.S. Cl. 260—279 8 Claims

ABSTRACT OF THE DISCLOSURE

10 - (arylaminoalkyl) - 9,9-dimethylacridans have antiviral activity.

CROSS REFERENCE

This is a division of Ser. No. 535,684 filed Mar. 21, 1966, now U.S. Patent 3,452,021.

DETAILED DESCRIPTION

According to the present invention, it has been found that novel acridan derivatives falling under the formula

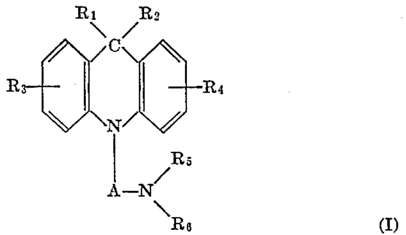

(I)

wherein $R_1$ represents a lower alkyl radical, $R_2$ represents hydrogen or a lower alkyl radical or $R_1$ and $R_2$ together represent a polymethylene bridge, so that these symbols $R_1$ and $R_2$ together with the carbon atom to which they are linked represent, in particular, a five-membered, six-membered or seven-membered saturated carbocyclic ring, each of $R_3$ and $R_4$, independently of the other, represents hydrogen, halogen up to the atomic number 35 inclusive, trifluoromethyl or a lower alkyl or lower alxoky radical, $R_5$ represents a phenyl radical, or a biphenylyl radical, the benzene nuclei of all of which can contain at most three substituents from the group formed by halogen atoms, trifluoromethyl radicals, nitro groups, amino groups and lower alkyl, lower alkoxy, lower alkylamino, di-lower alkylamino and lower alkanoylamino radicals, or it represents a pyridyl radical optionally substituted by halogen atoms, lower alkyl or lower alkoxy radicals, $R_6$ represents hydrogen or a lower alkyl radical, and A represents an alkylene radical having 2–6 carbon atoms, and their addition salts with inorganic and organic acids, have valuable pharmacological properties, particularly excellent antiviral activity, on the one hand, and tumor-inhibiting activity, on the other hand, combined with a favourable therapeutic index. The antiviral activity has been determined by animal tests, e.g., on mice against Columbia-SK virus, and tumor-inhibiting activity has been found in animal tests, e.g., on methylcholanthrene sarcoma or on dimethylbenzanthracene skin-tumors experimentally induced into mice. The animal tests characterize compounds of Formula I and their acid addition salts as active substances for the treatment of virus diseases such as encephalitis, encephalomyelitis and others, as well as for the treatment of neoplasia. Moreover, compounds of Formula I and their acid addition salts show a mild analgetic activity.

Compounds of Forumla I which show broad antiviral activity and especially significant activity against Columbia-SK virus, Herpes simplex virus and influenza A–PR 8 virus, are those falling under Foruma I, in which $R_5$ represents unsubstituted phenyl or phenyl substituted by halogen having an atomic number of up to 35 inclusive, trifluoromethyl, lower alkyl and/or lower alkoxy radicals, and especially halogeno - phenyl or halogeno-trifluoromethylphenyl. A in these compounds is preferably an ethylene or trimethylene radical.

More in particular, compounds falling under Formula I in which A represents a trimethylene bridge, and in which $R_2$ is phenyl or halogen-substituted phenyl, especially fluorophenyl, and $R_6$ is preferably hydrogen, as well as the pharmaceutically acceptable salts thereon with acids, exhibit a very interesting and entirely unexpected combination of antiviral activity, especially against Columbia-SK virus, with a mild analgesic activity; this combined activity indicates usefulness of these agents in the treatment of encephalitis and related virus diseases accompanied by pains, e.g. headache, whereby the often undesirable administration of two possibly insufficiently compatible medicaments, which are not well tolerated by certain individuals when applied jointly, can be avoided.

We have also found that known acridans the structure of which has certain similarities with that of the compounds of Formula I, and which have been recommended because of either antihistaminic, adrenolytic, sedative, hypothermic, or psychopharmaceutical effects, lack at least one, or even both of the properties making up the above described novel combination, in significant amount, and thus do not possess the above-mentioned, quite rare usefulness as combined antiviral-analgesic agents.

In the compounds of Formula I and the corresponding starting materials given below, $R_1$ and $R_2$ represent methyl, ethyl or n-propyl radicals, isopropyl, n-butyl or isobutyl radicals or, together they form, e.g., the tetramethylene, pentamethylene or hexamethylene radical, $R_2$ can also represent hydrogen. $R_3$ and $R_4$ independently of each other represent, e.g., hydrogen, fluorine, chlorine or bromine atoms, trifluoromethyl, methyl, ethyl, n-propyl, isopropyl, methoxy, ethoxy, n-propoxy or isopropoxy radicals. $R_5$ is, e.g. a phenyl, o-, m- or p-fluorophenyl, o-, m- or p-chlorophenyl, o- or p-bromophenyl, o-, m- or p-iodophenyl, α,α,α-trifluoro-o-tolyl, α,α,α-trifluoro-m-tolyl, α,α,α-trifluoro-p-tolyl, o-, m- or p-tolyl, o-ethylphenyl, p-ethylphenyl, p-isopropylphenyl, o-, m- or p-methoxyphenyl, p-ethoxyphenyl, p-(n-propoxy)-phenyl, p-isopropoxyphenyl, o-, m- or p-nitrophenyl, o-, m- or p-aminophenyl, o-, m- or p-acetamidophenyl, p-dimethylaminophenyl, p-diethylaminophenyl, p-ethylaminophenyl, 2,4- or 2,5-difluorophenyl, 2,3-, 2,4-, 2,5-, 3,4-, 3,5- or 2,6-dichlorophenyl, 2,4-, 2,5-, or 2,6-dibromophenyl, 2,3-, 2,4-, 2,5-, 2,6-, 3,4-, or 3,5-xylyl, 2,4-diethylphenyl, 2,4-, 2,5-, 3,4- or 3,5-dimethoxyphenyl, 2,5-diethoxyphenyl, 2,4,5-trichlorophenyl, 2,4,5-trimethylphenyl, mesityl, 3,4,5-trimethoxyphenyl, 3-chloro-4-fluorophenyl, 4-fluoro-o-tolyl, 5-fluoro-o-tolyl, 4-fluoro-m-tolyl, 2- or 3-fluoro-p-tolyl, 4-, 5- or 6-chloro-o-tolyl, 2-chloro-p-tolyl, 2-bromo-p-tolyl, 4-iodo-o-tolyl, 3-iodo-p-tolyl, 4-α,α,α-tetrafluoro-o-tolyl, 4,α,α,α-tetrafluoro-m-tolyl, 6,α,α,α-tetrafluoro-m-tolyl, 4-chloro-α,α,α-trifluoro-o-tolyl, 4-chloro-α,α,α-trifluoro-m-tolyl, 6-chloro-α,α,α-trifluoro-m-tolyl, 4-bromo-α,α,α-trifluoro-o-tolyl, 4-bromo-α,α,α-trifluoro-m-tolyl, 6-bromo-α,α,α-trifluoro-m-tolyl, 3-chloro-6-methoxyphenyl, 4 - methoxy-o-tolyl, 4-chloro-2-nitrophenyl, 4-chloro-3-nitrophenyl, 2-bromo-4-nitrophenyl, 4-, 5- and 6-nitro-o-tolyl, 2- and 3-nitro-p-tolyl, 4-nitro-α,α,α-trifluoro-m-tolyl, 2-nitro-α,α,α-trifluoro-p-tolyl, 2-methoxy-5-nitrophenyl, 2-methoxy-6-nitrophenyl, 4-methoxy-2-nitrophenyl, 2-amino-4-methoxyphenyl, 4,5-dichloro-o-tolyl, 2,4-dichloro-6-nitrophenyl, 2,5-dichloro-4-nitrophenyl, 4,5-dichloro-2-nitrophenyl, 5-nitro-2,4-xylyl, 4-nitro-2,5-xylyl, 6-nitro-3,4-xylyl, 4-nitro-α,α,α-trifluoro-o-tolyl, 2-amino-4,5-dichlorophenyl, 4-amino-3,5-dichlorophenyl, 6-amino-3,4-xylyl, 4-chloro-2,5-dimethoxyphenyl, 5-chloro-2,4-dimethoxyphenyl, 5-chloro-4-nitro-o-tolyl;

o-biphenylyl, p-biphenylyl;

2-pyridyl, 3-pyridyl, 4-pyridyl, 5-chloro-2-pyridyl, 5-bromo-2-pyridyl, 6-fluoro-3-pyridyl, 2-chloro-3-pyridyl, 4-methyl-2-pyridyl, 5-methyl-2-pyridyl, 6-methyl-2-pyridyl, 6-methoxy-3-pyridyl, 6-ethoxy-3-pyridyl, 6-n-butoxy-3-pyridyl, or 4,6-dimethyl-2-pyridyl radical.

$R_6$ is, for example, hydrogen or a methyl, ethyl, n-propyl, isopropyl, n-butyl, isobutyl, sec. butyl, n-pentyl, isopentyl or n-hexyl radical.

A is, for example, an ethylene, propylene, ethyl-ethylene, trimethylene, tetramethylene, pentamethylene or hexamethylene radical.

To produce the compounds of general Formula I a reactive ester of a 10-hydroxyalkyl-acridan of the general Formula II

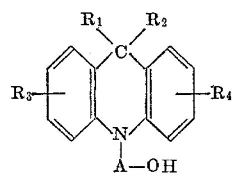

wherein $R_1$, $R_2$, $R_3$, $R_4$ and A have the meanings given above, for example a halide, preferably a chloride or bromide, an aryl sulphonic acid ester or alkane sulphonic acid ester, is reacted in the presence of an acid binding agent with an amine of the general Formula III $$H-N(R_5)(R_6) \quad (III)$$

wherein $R_5$ and $R_6$ have the meanings given above. The reaction is performed in a suitable organic medium, e.g., in a low alkanol or another aliphatic hydroxy compound such as ethanol, n-butanol, 2-methoxyethanol, in an ethereal liquid such as ethylene glycol and diethylene glycol dimethyl ether, tetrahydrofuran or dioxan, in a benzene hydrocarbon such as benzene, toluene or xylene, and/or in an excess of amine of the general Formula III. An excess of the latter can serve at the same time as acid binding agent but, particularly when $R_5$ is a phenyl radical which can be substituted, the use of tertiary organic bases such as triethylamine, diisopropylethyl amine, pyridine or sym. collidine as acid binding agent can also be advantageous. The reactions are generally performed at room temperature or at an elevated temperature up to about 200°. Halides, as reactive esters of compounds of the general Formula II, can be activated, e.g., with sodium or potassium iodide.

Compounds of the general Formula I having a low alkyl radical as $R_6$ are produced by a second process by reacting a metal compound of an acridan of the general Formula IV

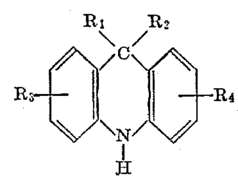

wherein $R_1$, $R_2$, $R_3$ and $R_4$ have the meanings given above, with a reactive ester of a compound of the general Formula V

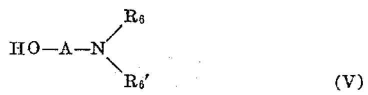

wherein $R_6'$ represents a low alkyl radical and $R_5$ and A have the meanings given above. The reactions are performed in the presence or absence of an inert organic solvent, e.g., a hydrocarbon such as benzene, toluene or xylene, ethereal liquids, e.g. dioxan, tetrahydrofuran, ethylene glycol dimethyl ether or diethylene glycol dimethyl ether, or in dimethyl formamide, e.g., at temperatures between 20° and 180°. An alkali metal compound formed in situ, e.g., with sodium or lithium amide, sodium or lithium hydride, serves in particular as metal compound.

A third process for the production of compounds of the general Formula I consists in reducing a compound of the general Formula VI

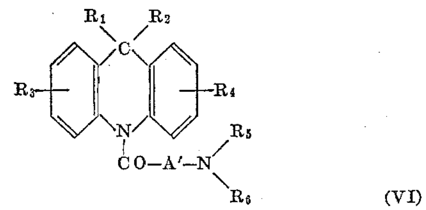

wherein A' represents an alkylidene or alkylene radical having 1 to 5 carbon atoms, and $R_1$, $R_2$, $R_3$, $R_4$, $R_5$ and $R_6$ have the meanings given above, with diboran in an ethereal liquid. Tetrahydrofuran, dioxan, methylene glycol dimethyl ether or diethylene glycol dimethyl ether are examples of reaction media. The reaction temperature is preferably between room temperature and about 100° and the duration is between about 30 minutes and 24 hours. The diboran, for example, is either developed from borontrifluoride etherate and sodium borohydride in a separate apparatus and then introduced into the reaction mixture, or it is formed in situ.

Compounds of the general Formula I wherein $R_6$ represents a low alkyl radical are produced by a fourth process by heating a compound of the general Formula VII

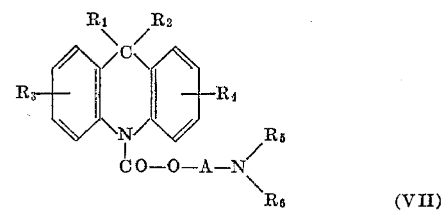

wherein $R_1$, $R_2$, $R_3$, $R_4$, $R_5$, $R_6'$ and A have the meanings given in general Formulae I and V respectively, until the equimolar amount of carbon dioxide is split off. The decarboxylation is performed in the presence or absence of a higher boiling, inert organic solvent such as Decalin, Tetralin, mesitylene etc.

Compounds of general Formula I wherein $R_6$ is a low alkyl radical are produced by a fifth process, by reacting a compound of the general Formula VIII

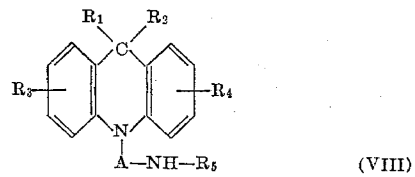

wherein $R_1$, $R_2$, $R_3$, $R_4$, $R_5$ and A have the meanings given above, with a reactive ester of a low alkanol or by reacting the compound of general Formula VIII with a low oxoalkane under reducing conditions. As reactive esters of low alkanols, particularly halides, alkane sulphonic acid esters and aryl sulphonic acid esters are used which are reacted with compounds of the general Formula VIII in organic solvents such as alcohols, e.g. methanol, ethanol, n-butanol, benzyl alcohol, hydrocarbons such as benzene or toluene, or ethereal liquids such as dioxan, tetrahydrofuran, ethylene glycol dimethyl ether and, preferably in the presence of an acid binding agent, e.g. triethylamine, diisopropylethylamine, collidine or an alkali carbonate and, optionally in the presence of a catalyst such as sodium or potassium iodide. Low oxoalkanes such as formaldehyde and acetaldehyde are reacted, e.g., in the presence of catalytically activated hydrogen in an inert organic solvent, with the compounds of general Formula VIII; formaldehyde can also be reacted in the presence of formic acid while heating.

Finally, compounds of the general Formula I wherein $R_1$ and $R_2$ are low alkyl radicals or, together, they represent a polymethylene radical are produced by a sixth process by reacting a compound of the general Formula IX

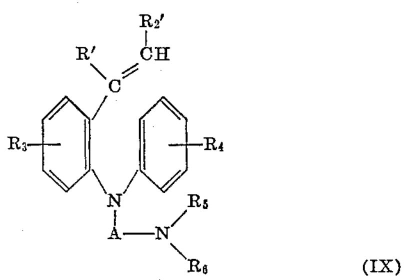

wherein $R_1'$ represents a low alkyl radical; $R_2'$ represents hydrogen, a low alkyl radical or, together with $R_1'$, a polymethylene radical, and $R_3$, $R_4$, $R_5$, $R_6$ and A have the meanings given in claim 1, with an acid condensing agent, e.g. borotrifluoride, the reaction being performed in an inert solvent such as benzene or concentrated sulphuric acid.

Starting materials of the general Formulae III, IV, IX as well as reactive esters of compounds of the general Formulae II and V are known and others can be produced analogously to the known compounds. Compounds of general Formula VI are produced, for example, by reacting 10-halogenoalkanoyl-acridans which are optionally substituted corresponding to the definitions given for $R_1$, $R_2$, $R_3$ and $R_4$ and of which some are known, with amines of the general Formula III. The reaction is performed analogously to that of reactive esters of compounds of general Formula II with amines of the general Formula III. Starting materials of the general Formula VII can be produced by reacting acridans of the general Formula IV with phosgene in suitable inert organic solvents such as benzene or toluene, and reacting the 10-chlorocarbonyl-acridans obtained with hydroxy compounds of the general Formula V. The starting materials of the general Formula VIII which are already embraced by general Formula I, are obtained analogously to the first general production process mentioned by reacting reactive esters of hydroxy compounds of the general Formula II with primary amines of general Formula III. Starting materials of the general Formula IX are formed analogously to the end products of general Formula I if, in the production process mentioned above for the latter, corresponding diphenylamine derivatives are used instead of acridans or acridan derivatives.

The compound of general Formula I produced by any of the processes according to the invention are converted, if desired, into their addition salts with inorganic and organic acids in the usual way. For example, the acid desired as salt component or a solution thereof is added to a solution of a compound of general Formula I in an organic solvent such as methanol, ethanol or ether and the salt precipitated is isolated. For use as pharmaceuticals, nontoxic salts are produced instead of the free bases, i.e., salts with those acids the anions of which are pharmacologically acceptable in the usual dosages, i.e., those which have no toxic effects. It is also of advantage if the salts to be used as pharmaceuticals crystallise well and are not or are only slightly hygroscopic. Hydrochloric acid, hydrobromic acid, sulphuric acid, phosphoric acid, methane sulphonic acid, ethane sulphonic acid, β-hydroxyethane sulphonic acid, acetic acid, lactic acid, oxalic acid, succinic acid, fumaric acid, maleic acid, malic acid, tartaric acid, citric acid, benzoic acid, salicylic acid, phenyl acetic acid, mandelic acid and embonic acid are used, for example, for salt formation with compounds of the general Formula I.

The new compounds of general Formula I and their pharmaceutically acceptable salts are administered orally, rectally and parenterally. The daily dosages of the free bases or of pharmaceutically acceptable salts thereof vary between 50 and 5000 mg. for adult patients. Suitable dosage units such as dragées (sugar coated tablets), tablets, suppositories or ampoules preferably contain 10–500 mg. of an active substance according to the invention or a pharmaceutically acceptable salt thereof. In addition, corresponding amounts of forms not made up into single dosages such as syrups, sprays, aerosols, ointments or powders can also be administered.

Dosage units for oral administration preferably contain between 5% and 90% of a compound of general Formula I or of a pharmaceutically acceptable salt thereof as active substance. They are produced, e.g., by combining the active substance with solid pulverulent carriers such as lactose, sucrose, sorbitol, mannitol; starches such as potato starch, maize starch or amylopectin, also laminaria powder or citrus pulp powder; cellulose derivatives or gelatin, optionally with the addition of lubricants such as magnesium or calcium stearate or polyethylene glycols (Carbowax) of suitable molecular weights, to form tablets or dragée cores. The latter are coated, e.g., with concentrated sugar solutions which can also contain, e.g., gum arabic, talcum and/or titanium dioxide or with a lacquer dissolved in easily volatile organic solvents or mixtures of solvents. Dyestuffs can be added to these coatings, e.g., to distinguish between varying dosages of active substance.

Dosage units for rectal administration are, e.g. suppositories which consist of a combination of an active ingredient or a suitable salt thereof with a neutral fatty basis, or also gelatin rectal capsules which contain a combination of the active substance or a suitable salt thereof with polyethylene glycols (Carbowax) of suitable molecular weight.

Ampoules for parenteral, particularly intramuscular administration preferably contain a water soluble salt of an active substance in a concentration of preferably 0.5–10%, in aqueous solution, optionally together with suitable stabilising agents and buffer substances.

The following prescription further illustrate the production of tablets and dragées:

(a) 1000 g. of active substance, e.g., 10-(3-anilinopropyl)-9,9-dimethyl-acridan hydrochloride are mixed with 550.0 g. of lactose and 292.0 g. of potato starch, the mixture is moistened with an alcoholic solution of 8 g. of gelatin and granulated through a sieve. After drying, 60.0 g. of potato satrch, 60.0 g. of talcum, 10.0 g. of magnesium stearate and 20.0 g. of colloidal silica are mixed in and the mixture is pressed into 10,000 tablets each weighing 200 mg. and containing 100 mg. of active substance (hydrochloride). If desired the tablets can be grooved for subdividing the dosage.

(b) A granulate is prepared from 1,000 g. of active substance, e.g. 10-[3-4-chloro-α,α,α-trifluoro-m-toluidinopropyl]-9,9-dimethyl-acridan, 379.0 g. of lactose and the alcoholic solution of 6.0 g. of gelatin. After drying, the granulate is mixed with 10.0 g. of colloidal silica, 40.0 g. of talcum, 60.0 g. of potato starch and 5.0 g. of magnesium stearate and the mixture is pressed into 10,000 dragée cores. These are then coated with a concentrated syrup of 533.5 g. of crystallised sucrose, 20.0 g. of shellac, 75.0 g. of gum arabic, 250.0 g. of talcum, 20.0 g. of colloidal silica and 1.5 g. of dyestuff and dried. The dragées obtained each weigh 240 mg. and contain 100 mg. of active substance.

The following nonlimitative examples illustrate the invention further. The temperatures are given in degrees centigrade. Percentages are given by weight unless expressly stated otherwise.

EXAMPLE 1

12.0 g. (0.042 mol) of 10-(3-chloropropyl)-9,9-dimethyl-acridan, 12.4 g. (0.063 mol) of 4-chloro-α,α,α-trifluoro-m-toluidine and 10.8 g. (0.084 mol) of diisopropylethylamine are heated for 16 hours in an oil bath at 135–140° while stirring. After cooling, 120 ml. of 1 N sodium hydroxide solution are added and the whole is extracted with ether. The ethereal phase is washed neutral with water, dried over sodium sulphate and concentrated. 21.2 g. of a viscous brown oil remains which is recrystallised from ethanol/water, whereupon 10-[3-(4-chloro-α,α,α-trifluoro-m-toluidino)-propyl]9,9-dimethyl-acridan are obtained, M.P. 108–110°.

The following compounds, for example, are produced in an analogous manner:

10[3-(2,4-dichloranilino)-propyl]-9,9-dimethyl-acridan, M.P. 77–78°;

9,9-dimethyl-10-[3-(p-fluoranilino)-propyl]-acridan, M.P. 68–69°, hydrochloride, M.P. 199–206° with decomposition;

10-[3-(3,4-dichloranilino)-propyl]-9,9-dimethyl-acridan, M.P. 104–106°;

10-[3-(p-bromanilino)-propyl]-9,9-dimethyl-acridan hydrochloride, M.P. 196–200°;

10-[3-(p-acetamido-anilino)-propyl]9,9-dimethyl-acridan hydrochloride, M.P. 238°;

10-[3-(6-ethoxy-3-pyridylamino)-propyl]-9,9-dimethyl-acridan dihydrochloride, M.P. 154°;

9-ethyl-10-[3-(4-chloro-α,α,α-trifluoro-m-toluidino)-propyl]-9-methyl-acridan.

The 10-(3-chloropropyl)-9,9-dimethyl-acridan used as starting material is produced as follows:

41.9 g. (0.2 mol) of 9,9-dimethyl-acridan are dissolved in 250 ml. of anhydrous toluene and a suspension of 3.9 g. (0.24 mol) of sodium amide in 30 ml. of anhydrous toluene is added while stirring under an atmosphere of nitrogen. The mixture is heated to the boil for 30 minutes while stirring until no more ammonia is developed. It is then left to cool to 45° when 63 g. (0.4 mol) of 1-bromo-3-chloropropane are added. The reaction mixture is then stirred for 2 hours at 50° and afterwards for 17 hours at 85°. 50 ml. of an 0.5 N hydrochloric acid solution and 300 ml. of ether are then added while cooling with ice. The phases are separated in a separating funnel, the ethereal phase is washed neutral with water, dried over sodium sulphate and concentrated. The residue is dried under water jet vacuum for 2 hours at a bath temperature of 40–50° whereupon the desired substance is obtained as a viscous brown oil.

EXAMPLE 2

17.1 g. (0.06 mol) of 10-(3-chloropropyl)-9,9-dimethyl-acridan and 28 g. (0.30 mol) of aniline are heated within 30 minutes to 100° while stirring and stirred for 9 hours at this temperature. The reaction mixture is flushed into a separating funnel with 30 ml. of glacial acetic acid; then 100 ml. of petroleum ether, 50 ml. of ether and 200 ml. of water are added thereto and the whole is well shaken. This causes the excess aniline to dissolve and the acetate of 10-(3-anilino-propyl)-9,9-dimethyl-acridan to precipitate as a grease. The acetate is removed and the base is liberated with 2 N sodium hydroxide solution. This is taken up in either, the ethereal solution is washed neutral with water, dried over sodium sulphate and concentrated. About 20 g. of a brown oil are obtained. This is dissolved in 150 ml. of ether and 50 ml. of a 1.3 N ethereal hydrochloric acid solution are added. The precipitated hydrochloride is filtered off under suction and recrystallised from acetone/ether. The 10-(3-anilino-propyl)-9,9-dimethyl-acridan hydrochloride melts at 147–150° with decomposition.

The following compounds, e.g., are produced in an analogous way:

9,9-dimethyl-10[3-(p-toluidino)-propyl]-acridan hydrochloride, M.P. 164–167° with decomposition;

9,9-dimethyl-10-[3-(2-pyridylamino)-propyl]-acridan hydrochloride, M.P. 277° with decomposition;

EXAMPLE 3

14.3 g. (0.05 mol) of 10-(3-chloropropyl)-9,9-dimethyl-acridan, 64 g. (0.50 mol) of p-chloraniline, 1 g. of potassium iodide and 100 ml. of n-butanol are refluxed for 21 hours. 25 ml. of 2 N sodium hydroxide solution are then added and the excess p-chloroaniline is distilled off with steam. The distillation residue is extracted with ether, the ethereal solution is washed neutral with water, dried over sodium sulphate and concentrated. The residue, 17 g. of a brown oil, is chromatographed on a column containing 500 g. of aluminium oxide (grade II according to Brockmann). The fractions eluted with hexane/20% benzene contain 8 g. of 10-[3-(p-chloranilino)-propyl]-9,9-dimethyl-acridan. This is dissolved in 100 ml. of ether and converted into the hydrochloride with ethereal hydrochloric acid, M.P. 205–212°.

EXAMPLE 4

7.2 g. (0.017 mol) of 10-[n-(4,5-dichloro-2-methylphenyl)-glycyl]-9,9-dimethyl-acridan are dissolved in 50 ml. of anhydrous tetrahydrofuran and the solution is cooled with an ice bath. Diboran (generated from 2.38 g. of sodium borohydride and 13.1 borontrifluoride etherate in 15 ml. of diethylene glycol dimethyl ether) are introduced into this solution while excluding moisture and stirring. The reaction mixture is then refluxed for 1 hour, after which a solution of 3 ml. of concentrated hydrochloric acid and 3 ml. of water is added dropwise while cooling with ice. The reaction mixture so obtained is concentrated in vacuo. The residue is taken up in ether, the ethereal solution is shaken with dilute ammonia solution, washed neutral with water, dried over sodium sulphate and concentrated. After recrystallisation from methylenechloride/hexane the 10-[2-(4,5-dichloro-2-methylanilino)-ethyl]-9,9-dimethyl-acridan obtained melts at 156–158°.

The following compounds, e.g., are produced in an analogous way:

9,9-dimethyl-10-[3-(5-chloro-2-pyridylamino)-propyl]-acridan hydrochloride, M.P. 279°;

10-[2-(4-chloro-3,6-dimethoxy-anilino)-ethyl]-9,9-dimethyl-acridan, M.P. 155°;

10-[2-(o-biphenylyl-amino)-ethyl]-9,9-dimethyl-acridan, M.P. 117°;

9,9-dimethyl-10-[2-(p-dimethylamino-anilino)-ethyl]-acridan maleate, M.P. 157° with decomposition;

10-[2-(4-chloro-3-nitro-anilino)-ethyl]-9,9-dimethyl-acridan, M.P. 115°;

10-[2-(p-ethylamino-anilino)-ethyl]-9,9-dimethyl-acridan hydrochloride, M.P. 192–193°;

6-chloro-10-[2-(4-chloro-α,α,α-trifluoro-m-toluidino)-ethyl]-9,9-dimethyl-2-methoxy-acridan hydrochloride, M.P. 170–180° with decomposition;

10-[2-(3-amino-anilino)-ethyl]-9,9-dimethyl-acridan dihydrochloride, M.P. 206–208° with decomposition;

10-[2-(3,4-dichloroanilino)-ethyl]-9,9-pentamethylene-acridan hydrochloride, M.P. 161–168° with decomposition;

6-chloro-10-[2-(4-chloro-α,α,α-trifluoro-m-toluidino)-ethyl]-9,9-dimethyl-2-methyl-acridan hydrochloride, M.P. 151–157° with decomposition;

10-(2-anilinoethyl)-9-methyl-acridan;

10-[2-(3,4-dichloroanilino)-ethyl]-9,9-dimethyl-3-trifluor-acridan methyl-9,9-dimethyl-10-[3-(5-methyl-2-pyridylamino)-ethyl-acridan.

The starting material used in this example is produced as follows:

104.7 g. (0.50 mol) of 9,9-dimethyl-acridan are dissolved in 500 ml. of anhydrous benzene and the solution is refluxed with 62.0 g. (0.55 mol) of chloracetyl chloride for 3 hours. The reaction mixture is then evaporated to dryness and the residue is recrystallised from methylene chloride/hexane. In this way, 128.7 g. of 10-chloracetyl-9,9-dimethyl-acridan are obtained, M.P. 134–136°.

28.5 g. (0.1 mol) of 10 - chloracetyl - 9,9-dimethyl-acridan, 17.6 g. (0.1 mol) of 4,5-dichlor-o-toluidine and 25.8 g. (0.2 mol) of diisopropylethylamine are heated for 20 hours in an oil bath at 130–140°. After cooling, 200 ml. of hexane and 150 ml. of 2 N hydrochloric acid are added and the solidified mass is triturated therewith. The insoluble part is filtered off under suction and washed first with 50 ml. of water and then with 50 ml. of hexane.

The filter residue is recrystallised from dioxan/water whereupon 10-[N-(4,5-dichloro-2-methylphenyl)-glycyl] 9,9-dimethyl-acridan is obtained, M.P. 206–209°.

EXAMPLE 5

4.2 g. (0.02 mol) of 9,9-dimethyl-acridan, M.P. 123–124°, are dissolved, under an atmosphere of nitrogen, in 25 ml. of anhydrous toluene. 25 ml. (0.02 mol) of a sodium amide suspension in anhydrous toluene are added while stirring and the reaction mixture is refluxed for 40 minutes. A solution of 3.2 g. (0.02 mol) of N-(2-chlorethyl)-N-methyl-aniline in 20 ml. of anhydrous toluene is then added and the whole is refluxed for another 14 hours. 50 ml. of water are then added and the reaction mixture is extracted with 200 ml. of ether. The ethereal solution is washed neutral with water, dried over sodium sulphate and concentrated. The residue (7.0 g.) is chromatographed on 200 g. of aluminium oxide (grade II according to Brockmann). The fractions eluted with hexane contain the 9,9-dimethyl-10-[2-(N-methylanilino)-ethyl]-acridan. Recrystallised from hexane it melts at 87–88°.

10-[2 - (N - ethyl - 3,4-dichloranilino)-ethyl]-9,9-dimethyl-acridan, for example, is produced in an analogous manner.

EXAMPLE 6

0.58 g. (0.0015 mol) of 9,9-dimethyl-acridan-10-carboxylic acid-2-(N-methylanilino)-ethyl ester are heated for 3 hours under water jet vacuum (11 torr) at 200–210° until no more carbon dioxide is developed. The crude pyrolysis product is chromatographed on 15 g. of aluminium oxide (grade II according to Brockmann). The fractions eluted with hexane contain the 9,9-dimethyl-10 - [2-(N-methylanilino)-ethyl]-acridan. Recrystallised from hexane, it melts at 87–88°.

The 9,9 - dimethyl - acridan - 10 - carboxylic acid-2-(N - methylanilino) - ethyl ester used as starting material is produced as follows:

2.71 g. (0.01 mol) of 9,9-dimethyl-10-chlorocarbonyl-acridan, M.P. 145°, 1.51 g. (0.01 mol) of 2-(N-methyl-anilino)-ethanol, B.P. 142–144°, and 1.3 g. (0.01 mol) of diisopropylethylamine in 40 ml. of anhydrous xylene are refluxed for 14 hours. After cooling, 20 ml. of water are added and the mixture is extracted with 200 ml. of ether.

The ethereal phase is washed neutral with water, dried over sodium sulphate and concentrated. The residue (2.7 g.) is chromatographed on 40 g. of aluminium oxide (grade II according to Brockmann). The fractions eluted with hexane/benzene 1:1 contain the 9,9-dimethyl-acridan-10-carboxylic acid-2-(N-methylanilino)-ethyl ester. It is a viscous oil which cannot be crystallised.

EXAMPLE 7

1.03 g. (0.003 mol) of 10 - (3-anilinopropyl)-9,9-dimethyl-acridan, 2.13 g. (0.015 mol) of methyl iodide and 30 ml. of methanol are refluxed for 15 hours. The brown reaction solution is concentrated to dryness under water jet vacuum. 30 ml. of 2 N ammonium hydroxide are added to the residue which is then extracted with 200 ml. of ether. The ethereal phase is washed neutral with water, dried over sodium sulphate and concentrated.

To remove non-alkylated starting material, the residue obtained (0.8 g.) is dissolved in 5 ml. of chloroform, 2 ml. of acetyl chloride are added and the whole is boiled for 5 minutes on a water bath. After cooling, it is poured onto ice, taken up in 200 ml. of a mixture of ether/petroleum ether 1:1 and the solution is washed with 2 N sodium carbonate solution and with water. After drying and distilling off the solvent, an oily residue remains which is taken up in 15 ml. of ether and a solution of 0.8 g. of oxalic acid. $2H_2O$ in 0.5 ml. of acetone is added. Whilst the acetylated but not alkylated starting material remains in solution, the 9,9-dimethyl-10-[3-(N-methyl-anilino)-propyl]-acridan oxalate crystallises out; M.P. 153–154° with decomposition.

EXAMPLE 8

9,9-dimethyl-10-(N-methylanilino-ethyl)-acridan 8.4 g. (0.0245 mol) of 2 - isopropenyl-N-(N-methyl-anilino-ethyl)-diphenylamine are dissolved in 40 ml. of borontrifluoride etherate and 2 ml. of water are added while stirring whereupon the reaction temperature rises to 50°. The whole is stirred for 1 hour and then 30 ml. of water are added dropwise. Stirring is continued for another 30 minutes and then 50 ml. of concentrated sodium hydroxide solution are added. After cooling, the reaction mixture is extracted with ether, the ethereal phase is washed neutral with water, dried over sodium sulphate and concentrated. In this way, 8.0 g. of crystalline crude product are obtained. Recrystallisation from hexane yields 6.5 g. of 9,9 - dimethyl-10-(N-methylanilino-ethyl)-acridan which melts at 87–88°.

The 2-isopropenyl-N-(N-methylanilino-ethyl)-diphenylamine used as starting material is obtained as follows from N-phenyl-anthranilic acid methyl ester:

2-isopropenyl-diphenylamine 45.5 g. (0.20 mol) of N-phenyl-anthranilic acid methyl ester dissolved in 100 ml. of anhydrous benzene are added dropwise to a methyl magnesium iodide solution produced from 19.5 g. (0.80 mol) of magnesium and 116.4 g. (0.82 mol) of methyl iodide in 250 ml. of anhydrous ether. The addition is made within 15 minutes at a reaction temperature of 30°. The whole is then stirred for 6 hours at a bath temperature of 50° whereupon it is poured onto ice. The organic phase is separated and washed twice with aqueous sodium chloride solution, dried and concentrated. 43.1 g. of a dark red oil are obtained. The oil is distilled under high vacuum. The fraction which passes over at 153–167°/0.02 torr (25.1 g.) is further purified by chromatography on 750 g. of aluminum oxide (grade II according to Brockmann). The fractions eluted with hexane yield 20.6 g. of pure 2-isopropenyl-diphenylamine as a colourless oil.

2-isopropenyl-N-(N-methylanilino-ethyl)-diphenylamine 10.46 g. (0.05 mol) of 2-isopropenyl-diphenylamine are dissolved in 50 ml. of anhydrous toluene and 7.2 ml. (0.06 mol) of a 8.33 molar sodium amide suspension in toluene are added under an atmosphere of nitrogen. The whole is then boiled for 1 hour while stirring after which 11.03 g. (10.067 mol) of N-chlorethyl-N-methyl-aniline dissolved in 70 ml. of anhydrous toluene are added dropwise. The whole is then refluxed for 15 hours. After cooling, 50 ml. of water are added while stirring and the crude reaction mixture is extracted with ether. The ethereal solution is washed neutral with water, dried and concentrated, whereupon 20.8 g. of crude product in the form of a brown, clear oil are obtained. This oil is chromatographed on 600 g. of aluminium oxid (grade II according to Brockman). The fractions eluted with hexane and with hexane/10% benzene yield 15 g. of pure 2 - isopropenyl-N-(N-methylanilino-ethyl)-diphenylamine as a colourless oil.

We claim:

1. A compound of the formula:

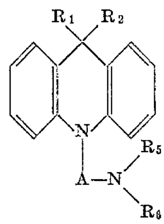

wherein $R_1$ is methyl;

$R_2$ is hydrogen, methyl or ethyl;

$R_5$ is (a) an unsubstituted phenyl group, (b) a phenyl group having from one to two substituents selected from the group consisting of chloro, fluoro, bromo, trifluoromethyl, nitro, lower alkyl, lower alkoxy, amino, mono-lower alkylamino di-lower alkylamino, lower alkanoyl-amino or phenyl (c) an unsubstituted pyridyl group or (d) a pyridyl group having a substituent selected from the group consisting of chloro, lower alkyl or lower alkoxy;

$R_6$ is hydrogen or lower alkyl; and

A is ethylene or trimethylene.

2. The pharmaceutically acceptable nontoxic acid addition salts of a compound according to claim 1.

3. A compound according to claim 1 wherein $R_2$ is methyl, R is hydrogen and A is trimethylene.

4. A compound as defined in claim 3, wherein $R_5$ represents phenyl.

5. A compound as defined in claim 3, wherein $R_5$ represents 4-chloro-3-trifluoromethyl-phenyl.

6. A compound as defined in claim 3, wherein $R_5$ represents p-bromophenyl.

7. A compound as defined in claim 3, wherein $R_5$ represents p-chlorophenyl.

8. A compound as defined in claim 3, wherein $R_5$ represents p-fluorophenyl.

References Cited

UNITED STATES PATENTS 3,282,943 11/1966 Landgraf et al. ------ 260—279
3,284,454 11/1966 Haring et al. -------- 260—279

DONALD G. DAUS, Primary Examiner

U.S. Cl. X.R.

424—257

PO-1050
(5/69)

UNITED STATES PATENT OFFICE
CERTIFICATE OF CORRECTION

Patent No. 3,498,986 Dated March 3, 1970

Inventor(s) Alex Meisels and Angelo Storni

It is certified that error appears in the above-identified patent and that said Letters Patent are hereby corrected as shown below:

Column 1, line 20, "Ser. No. 535,684" should read -- Ser. No. 525,684 --

Column 2, line 8, "Foruma" should read -- Formula -- line 17, "$R_2$" should read -- $R_5$ -- line 19, "thereon" should read -- thereof --

Column 4, line 4 in Formula (V), "$R_6$" should read -- $R_5$ -- line 53 in Formula (VII), "$R_6$" should read -- $R_6$'--

Column 5, line 22 in Formula (IX), "R'" should read -- $R_1$'--

Column 6, line 55, "prescription" should read -- prescriptions--

Column 7, line 73, "either" should read -- ether --

Column 12, line 8 (claim 3), "R" should read -- $R_6$--

SIGNED AND SEALED

JUL 21 1970

(SEAL)
Attest:

Edward M. Fletcher, Jr.
Attesting Officer

WILLIAM E. SCHUYLER, JR.
Commissioner of Patents